United States Patent
Muller (10) Patent No.: US 9,512,723 B2
(45) Date of Patent: Dec. 6, 2016

(54) METHOD FOR REMOVING AND/OR INSTALLING A TURBINE BEARING AND A DEVICE FOR CARRYING OUT THE METHOD

(71) Applicant: Siemens Aktiengesellschaft, Munich (DE)

(72) Inventor: Dirk Muller, Mulheim a.d.Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 14/368,744

(22) PCT Filed: Nov. 29, 2012

(86) PCT No.: PCT/EP2012/073905
§ 371 (c)(1),
(2) Date: Jun. 25, 2014

(87) PCT Pub. No.: WO2013/098028
PCT Pub. Date: Jul. 4, 2013

(65) Prior Publication Data
US 2015/0026979 A1    Jan. 29, 2015

(30) Foreign Application Priority Data

Dec. 30, 2011  (EP) .................................. 11010310

(51) Int. Cl.
*F01D 5/00* (2006.01)
*B25B 27/06* (2006.01)
(Continued)

(52) U.S. Cl.
CPC ............... *F01D 5/005* (2013.01); *B23P 19/04* (2013.01); *B25B 27/06* (2013.01); *F01D 25/285* (2013.01);
(Continued)

(58) Field of Classification Search
CPC ........... Y10T 29/53796; Y10T 29/5383; Y10T 29/53848; Y10T 29/53852; Y10T 29/53983; Y10T 29/49696; Y10T 29/49698; B25B 27/06; B25B 27/062; B25B 27/064; F01D 25/285; F05B 2230/70; F05B 2230/80; F05B 2240/50; F05D 2230/70; F05D 2230/80; F05D 2240/50

See application file for complete search history.

(56) References Cited

U.S. PATENT DOCUMENTS 3,217,395 A * 11/1965 McBroom ............... B23P 19/02
  29/234
3,403,434 A   10/1968 Calabro
(Continued)

FOREIGN PATENT DOCUMENTS

DE    19643336 A1   4/1998
EP    0050796 A1   5/1982
(Continued)

*Primary Examiner* — Jason L Vaughan
(74) *Attorney, Agent, or Firm* — Beusse Wolter Sanks & Maire (57) ABSTRACT

A method and a device are provided for removing a turbine bearing or a bearing segment of a preferably stationary turbo engine, having a housing that may preferably be split in half while the housing is closed. The method includes: supporting the rotor to relieve the turbine bearing of the weight of the rotor, fastening a support plate to a turbine bearing housing, attaching two parallel, rail-like supports to the support plate and fastening a cross-beam to ends of supports, fastening a counter-bearing plate having at least two push/pull rods to the turbine bearing housing, and fastening the push/pull rods to the turbine bearing and detaching the fastening of the turbine bearing from the turbine bearing housing and pulling the turbine bearing located in the (Continued)

operating position thereof out of the turbine bearing housing with the aid of the push/pull rods.

15 Claims, 5 Drawing Sheets

(51) Int. Cl.
 *F01D 25/28* (2006.01)
 *B23P 19/04* (2006.01)
(52) U.S. Cl.
 CPC ........ *F05B 2230/60* (2013.01); *F05B 2230/70* (2013.01); *F05B 2230/80* (2013.01); *F05B 2240/50* (2013.01); *F05D 2230/60* (2013.01); *F05D 2230/70* (2013.01); *F05D 2230/80* (2013.01); *F05D 2240/50* (2013.01); *Y10T 29/4932* (2015.01); *Y10T 29/49318* (2015.01); *Y10T 29/53* (2015.01)

(56) References Cited

U.S. PATENT DOCUMENTS

| | | | |
|---|---|---|---|
| 4,120,082 A | 10/1978 | Bond | |
| 4,192,054 A * | 3/1980 | Webb | B23P 19/021 29/252 |
| 4,451,979 A | 6/1984 | Schuster | |
| 4,485,542 A * | 12/1984 | Vasoll | B23P 19/084 29/252 |
| 4,567,649 A | 2/1986 | Schmitdt | |
| 4,635,336 A | 1/1987 | Ades | |
| 7,836,595 B1 * | 11/2010 | Ohl, Jr. | B23P 11/00 29/23.51 |
| 8,127,417 B1 * | 3/2012 | Butler | B23P 19/025 29/255 |
| 8,713,776 B2 * | 5/2014 | Herbold | F23R 3/002 29/256 |
| 2003/0014854 A1 * | 1/2003 | Brown | B25B 27/023 29/426.5 |

FOREIGN PATENT DOCUMENTS

| | | |
|---|---|---|
| EP | 0051178 A1 | 5/1982 |
| EP | 0051178 B1 | 8/1986 |
| GB | 2320527 A | 6/1998 |
| JP | S4835245 A | 5/1973 |
| JP | S57106356 A | 7/1982 |
| JP | S57114334 A | 7/1982 |
| JP | H0374501 A | 3/1991 |
| JP | 2001062748 A | 3/2001 |

* cited by examiner

METHOD FOR REMOVING AND/OR INSTALLING A TURBINE BEARING AND A DEVICE FOR CARRYING OUT THE METHOD

CROSS REFERENCE TO RELATED APPLICATIONS

This application is the US National Stage of International Application No. PCT/EP2012/073905 filed Nov. 29, 2012, and claims the benefit thereof. The International Application claims the benefit of European Application No. EP11010310 filed Dec. 30, 2011. All of the applications are incorporated by reference herein in their entirety.

FIELD OF INVENTION

The invention relates to a method for removing and/or installing a turbine bearing from or onto the rotor of a preferably static turbomachine when the housing is closed. The invention further relates to a device which is suitable for carrying out the method.

BACKGROUND OF INVENTION

Static gas turbines have been known for a long time from the extensive available prior art. The rotors of these turbines are commonly borne radially both at a compressor-side end and at a turbine-side end. The turbine-side radial bearing—also termed the turbine bearing—of gas turbines is located inside the exhaust-gas path of the gas turbine, in most cases immediately behind the last rotor blade row of the turbine unit. For bearing purposes, a small number of radially-extending bearing struts, that is to say four, five or six, are usually provided in the exhaust-gas path and, located in the center of these, there is an enclosure for the turbine bearing housing and the turbine-side radial bearing.

Defects on the turbine bearing, on the bearing shells or also on the bearing segments—what are termed the pads—can lead to these components having to be replaced. In the case of static gas turbines, which are commonly equipped with a housing which can be split in half along a parting plane, in the event of repairs the upper housing half of the gas turbine must be first separated from the lower housing half and then lifted off. Subsequently, the rotor—including the turbine bearing—laid in the lower housing half must be removed. Only then is it possible to remove the bearing from the rotor.

This procedure is however particularly time-consuming since, after the lengthy process of cooling down the gas turbine, a relatively long set-up time is required in order to release the housing screw connections, uncover the gas turbine and remove the rotor. Once the defective component has been repaired, the rotor must once again be laid and oriented in the lower housing half. Then, the upper housing half must be installed in order to close the gas turbine. The housing halves must therefore be fastened to each other by means of the known screw connections. All this requires a relatively long downtime for the static gas turbine.

For these reasons, there is a need to reduce the downtime for the gas turbine.

SUMMARY OF INVENTION

It is therefore an object of the invention to provide a method which overcomes the aforementioned drawbacks. It is a further object of the invention to provide a tool which supports the method.

The object relating to the method is achieved by means of a method and the tool of a device as claimed.

Advantageous features, which depending on the category of claim may be combined with one another in any manner, are detailed in the dependent claims.

In order to remove the turbine bearing or the constituent parts thereof, it is provided in accordance with aspects of the invention that, first, the rotor arranged in the static turbomachine is supported or held in order to free the turbine bearing from the weight of the rotor. Then a support plate for beams is fastened to a turbine bearing housing. After that, two mutually parallel rail-like beams are attached to the support plate, after which a cross beam is fastened to those ends of the beams which face toward the exhaust-gas diffuser. Preferably, an abutment plate having at least two push/pull rods is then fastened to the turbine bearing housing, whereupon the push/pull rods are fastened to the turbine bearing. Finally, the turbine bearing which is in its operating position is extracted from the turbine bearing housing. Provided that an abutment plate having the push/pull rods is used, the movement is of course performed with the aid of the push/pull rods.

It is possible, with the aid of the proposed method, to remove the turbine bearing of the static turbomachine, or the segments thereof, from the turbomachine without the turbomachine itself having to be uncovered and the rotor thereof having to be removed. The method may consequently be carried out when the turbomachine housing is closed, that is to say when the upper housing half is installed. The only precondition for this is that there be sufficient free space in the immediate vicinity of the turbine bearing for the installers and for the device required to carry out the work. Provided that the turbomachine is configured as a static gas turbine for generating energy, and the rated power of the gas turbine is around 100 MW and above, these free spaces are mostly part of an exhaust-gas path of such dimensions that even installers can move around inside them. Access to the exhaust-gas path or the free space is then via a manhole provided in the duct boundary of the exhaust-gas path or of the exhaust-gas diffuser. In the case of smaller turbomachine constructions, it is conceivable for the duct boundary of the exhaust-gas duct to be partially or entirely removed in order to achieve the necessary free space.

After removal and repair/replacement of the turbine bearing, assembly of the turbine bearing is, according to aspects of the invention, carried out in corresponding fashion. It is provided that the rotor of the static turbomachine is already supported or held. If not present, the support plate is fastened to one end side of a turbine bearing housing, to which two rail-like beams are attached to the support plate. A cross beam can thus be fastened to both beam ends on the exhaust-gas housing side. The turbine bearing to be installed is then placed on the beams and moved into an intermediate position in the direction of the turbine bearing. Preferably, after that, an abutment plate having at least two movable push/pull rods is fastened to the turbine bearing housing and the two push/pull rods are fastened to the turbine bearing. The turbine bearing can then be moved, with the aid of the push/pull rods, from the intermediate position into its installation position, that is to say its operating position.

By using the method according to aspects of the invention for removing or installing a turbine bearing, the set-up time for repairing the turbomachine or for maintaining the turbomachine is reduced significantly, which significantly increases the availability of the latter.

With the aid of the beams, the turbine bearing may be extracted from its operating position solely by means of an axial movement with respect to the machine axis of the turbomachine, without further auxiliary means for holding the weight of the turbine bearing being necessary. The beams therefore end, on the turbine side, right next to the turbine bearing and therefore take up, upon extraction or before insertion, the weight of the turbine bearing. This weight is then conducted into the substructure via the support plate, the turbine bearing housing and the housing of the static turbomachine. Accordingly, this component of the device is configured such that the weight forces are always safely conducted away. Particularly advantageously, the two beams are installed at approximately 4 o'clock and 8 o'clock positions of the turbine bearing, such that the resulting weight of the turbine bearing acts centrally between these on both beams. In order then to prevent the two beam ends from spreading apart, a cross beam is fastened to those ends of the beams which would otherwise end freely in the exhaust-gas duct. Thus, the two rail-like beams remain always mutually parallel, even when loaded with the turbine bearing, without there being any danger of the two beams moving apart from one another and of the turbine bearing slipping between them. At the same time, the cross beam delimits the movement path of the turbine bearing.

The push/pull rods allow the turbine bearing to move always parallel to the machine axis of the turbomachine without any canting of the turbine bearing at or in the turbine bearing housing taking place in the process. This ensures that the turbine bearing to be installed or removed can be moved and protects these turbine bearing components from damage caused by canting.

The device according to aspects of the invention for installing and/or removing a turbine bearing, a bearing segment or other various parts of the turbine bearing of a preferably static turbomachine having a housing which can preferably be split in half when the housing is closed comprises: a support plate for fastening to a turbine bearing housing of a turbine bearing, at least two mutually parallel rail-like beams which are fastened perpendicularly to the support plate and are preferably equipped with rollers, and a cross beam which is fastened to the beam ends, and also an abutment plate provided for fastening to the turbine bearing housing and having at least two push/pull rods which can be moved thereon and which are provided for fastening to the component to be removed or installed. The push/pull rods are preferably hydraulically coupled to the abutment plate, so that the force required to extract or insert the turbine bearing can, where appropriate, be provided hydraulically.

In order to be able to move the turbine bearing along the beams with comparatively little force, it is preferably provided that the beams are in each case configured as a roller track. By using roller tracks, the turbine bearing extracted or to be inserted can be moved using little force, without machine support being necessary. In addition, the rolling planes of the roller tracks are inclined with respect to one another. The inclinations of the two rolling planes form a V with each other and are chosen such that these are always tangential to the rolling surface of the turbine bearing or the sliding elements—if present.

Since turbine bearings may also be of comparatively thin construction in the axial direction, and the separations between two immediately adjacent rollers of the roller track may be of this order of magnitude, it is advisable to attach sliding elements to the turbine bearing for each roller track, in order to ensure that, as the turbine bearing is being moved, in every movement position and for each roller track, the turbine bearing is safely borne by at least two rollers. This too prevents the turbine bearing to be moved from canting/tipping.

BRIEF DESCRIPTION OF THE DRAWINGS

Further advantages, features and properties of the invention will be described in more detail with reference to a preferred exemplary embodiment in the following drawings, in which.

In all figures, identical features are given the same reference signs.

DETAILED DESCRIPTION OF INVENTION

Figure 1:
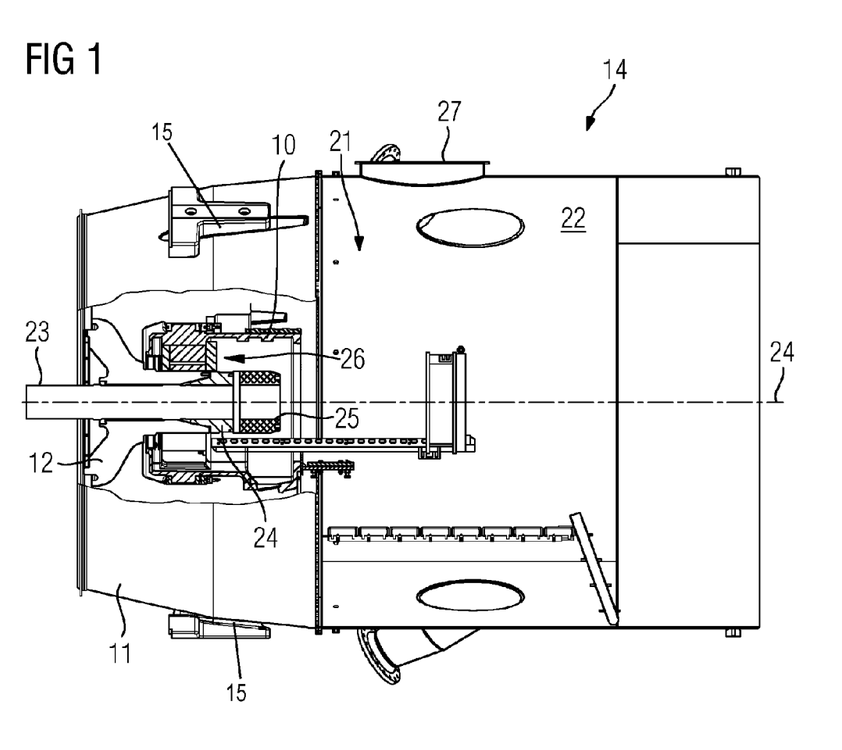
FIG. 1 shows a longitudinal partial section through a gas turbine exhaust-gas housing.

FIG. 1 shows, in longitudinal partial section, a gas turbine exhaust-gas housing 11 of a turbomachine configured as a static gas turbine 14. The gas turbine 14 has, upstream of the gas turbine exhaust-gas housing 11, a housing (not shown) which can be split in half with a lower housing half and an upper housing half which are connected to one another in a known fashion in the manner of a flange and are screwed together by means of corresponding screw connections. The gas turbine exhaust-gas housing 11 of the gas turbine 14 is of undivided configuration and delimits, as a duct boundary, an exhaust-gas duct 21 which merges into an exhaust-gas diffuser 22. In the gas turbine exhaust-gas housing 11, five bearing struts 15 which extend in the radial direction are evenly distributed around the circumference and together bear and hold a bearing enclosure on the radially inward side. A turbine bearing housing 10 having a turbine bearing 26 for the radial bearing of a rotor 12 of the gas turbine 14 is provided in the bearing enclosure. In the configuration of the gas turbine 14 shown in FIG. 1, the rotor 12 is of disk-type construction with a tie rod 23 extending centrally through the disks. The tie rod 23 is also provided, at the turbine end, with a thread 25 onto which a tie rod nut 24 is screwed.

Figure 5:
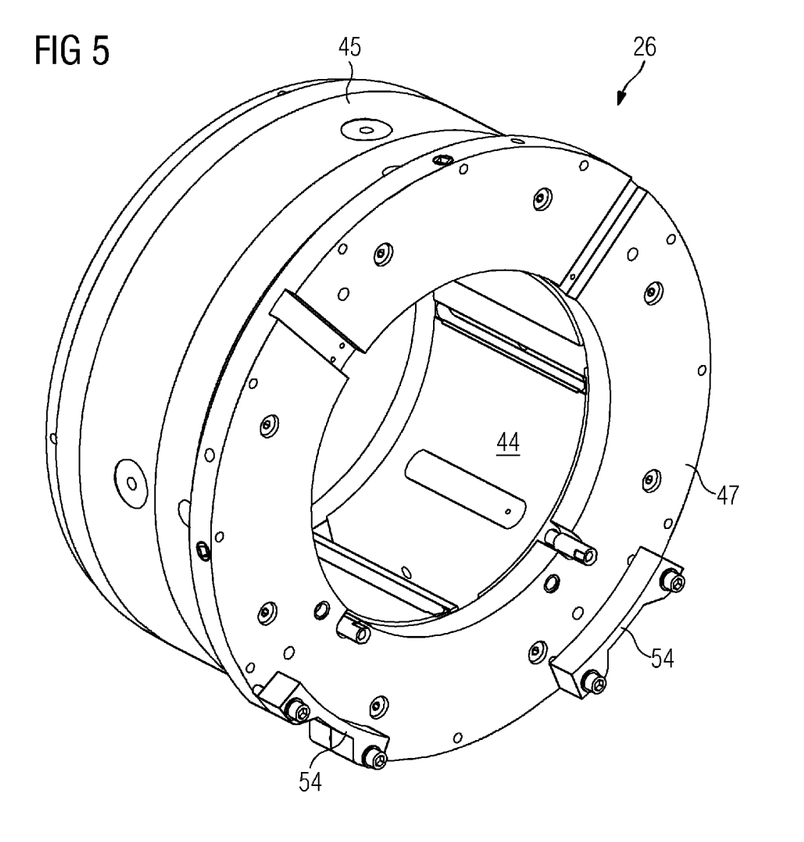
FIG. 5 shows the turbine bearing having sliding elements arranged thereon.

The turbine bearing 26 essentially comprises, as constituent parts, a bearing ring 45, a plurality of bearing segments 44 and a cover plate 47 (FIG. 5).

Furthermore, a working platform 33 is installed inside the exhaust-gas diffuser 22 in order, on one hand, to provide installers with a secure standing surface and, on the other hand, to allow them to carry out their work ergonomically.

Figure 2:
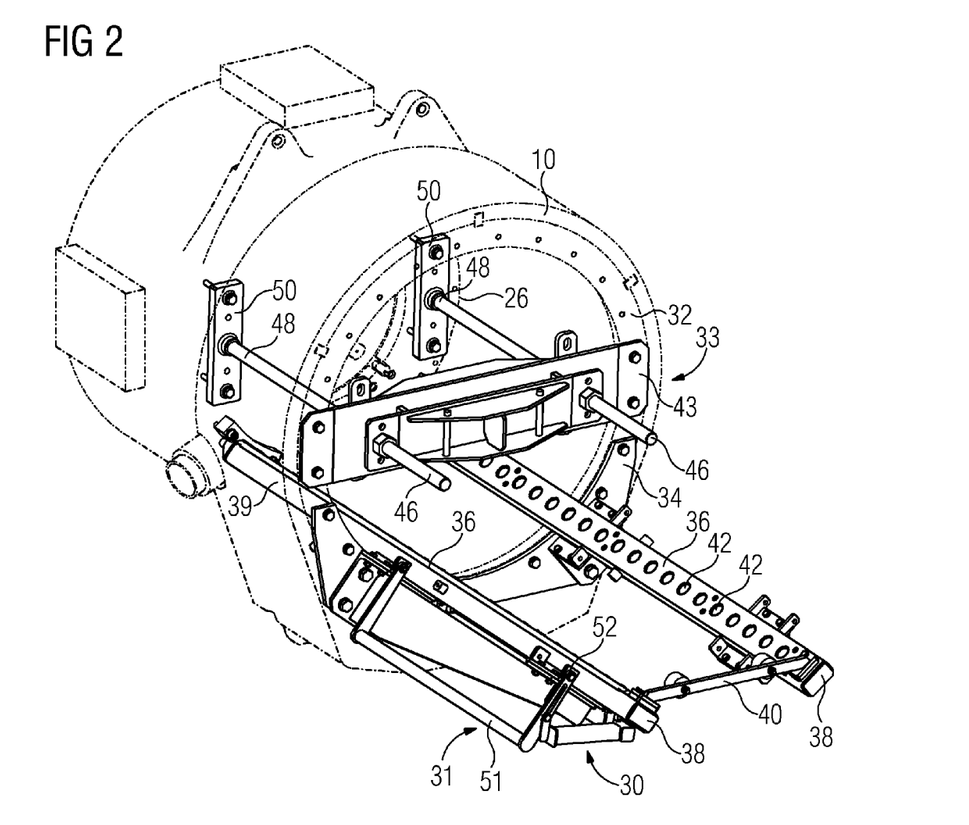
FIG. 2 is a perspective view of a turbine bearing housing from FIG. 1 having, fastened thereto, a device for extracting the turbine bearing.

FIG. 2 shows in a perspective representation, omitting the rotor and the duct boundary of the exhaust-gas duct 21, the turbine bearing housing 10 shown in FIG. 1 in perspective representation. The device 30 for installing and/or removing the turbine bearing 26 is represented by means of thicker lines in FIG. 2 to FIG. 4. The turbine bearing housing 10 is drawn using thinner lines, such that parts thereof are to be considered to be transparent. However, the transparency relates only to elements of the device 30. Thus, those elements of the turbine bearing housing 10 which are in the background on account of the perspective representation are partially obscured by constituent parts in the foreground and are accordingly not shown.

The device 30 preferably comprises two components 31, 33 which can be handled independently of one another, of which the first component 31 is absolutely necessary and the second component 33 is only optional. The first component 31 serves to carry the weight of the turbine bearing 26 to be installed/removed. The second component 33 serves for the initial extraction and/or for the insertion of the turbine bearing 26 from or into the turbine bearing housing 10.

In the turbine bearing housing 10 is the turbine bearing 26 which is in its operating position and of which only part is visible on account of the perspective representation in FIG. 2. The turbine bearing housing 10 has an end side 32 which faces toward the outflow side of the exhaust-gas duct 21. A support plate 34 is fastened to this end side 32. This support plate 34 extends over an arc length of approximately 160° and is fastened centrally to the 6 o'clock position of the turbine bearing housing 10. Two mutually parallel rail-like beams 36 also termed running rails which are screwed to the support plate 34 are provided at a 4 o'clock and an 8 o'clock position. The ends 38 of the beams 36 which point toward the outflow side are securely connected to one another by means of a cross beam 40. The ends 39 of the beams 36 which are opposite these ends 38 reach until immediately next to the turbine bearing 26. The beams 36 are configured as roller tracks, in each case with a multiplicity of rollers 42, the axes of rotation of which, on each roller track, are oriented parallel to one another.

In this manner, the first component 31 comprises the support plate 34, the beams 36, the cross beam 40 and, only described in detail below, a securing bracket 51 including the associated locking element.

It is possible, by means of the modular construction of the first component, for the constituent parts thereof to be introduced through a manhole 27 into the exhaust-gas duct 21 (FIG. 1) without the duct boundary of the latter having to be removed. The components 31, 33 need not necessarily be of modular configuration as shown. Provided that relatively large manholes are present or the exhaust-gas diffuser 22 can be partially or entirely removed, the components 31, 33 may either be composed of relatively large subassemblies or may even be of one-piece construction.

An abutment plate 43 is also screwed onto the end side 32 of the turbine bearing housing 10 at a 9 o'clock and a 3 o'clock position. Two mutually parallel movable push/pull rods 46 are borne on the abutment plate 43 by means of a pressure/support plate. Those ends 48 of the push/pull rods 46 which face the turbine bearing 26 have fastening flanges 50 which can be screwed to the turbine bearing 26 which is to be removed. The second component 33 thus comprises the abutment plate 43, the pressure/support plate and push/pull rods 46.

Depending on the configuration of the turbine bearing 26, and depending on the constituent parts of the turbine bearing 26 which are to be removed/installed, the fastening flanges 50 may also be omitted and/or other and/or further devices for connecting the push/pull rods 46 to the corresponding constituent parts may be used. In particular, if only some of the bearing segments have to be removed, a further device is necessary.

Depending on which side of the abutment plate 43 is fastened to the end side 32 of the bearing housing 10, the second component 33 of the device 30 is used either to extract (FIG. 2) the turbine bearing 26 or to insert (FIG. 3) the turbine bearing 26. Different second components are consequently not necessary.

Figure 4:
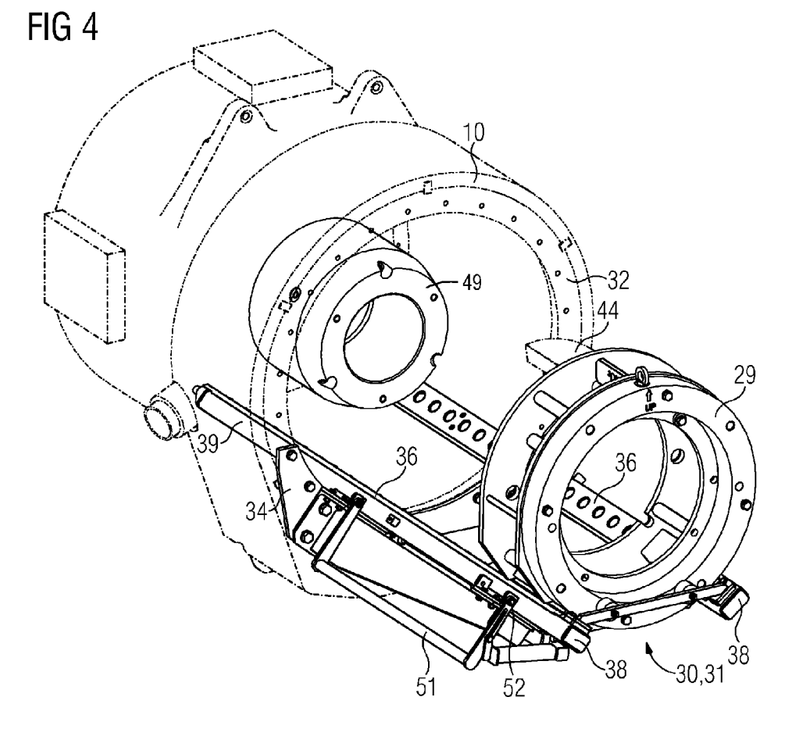
FIG. 4 shows the perspective view as shown in FIG. 2 with the turbine bearing removed from the turbine bearing housing.

FIG. 4 shows a further device 29 which is located on the beams 36 outside the turbine bearing housing 10 and which has, arranged thereon, a bearing segment 44 of the turbine bearing 26 after removal from or before installation in the turbine bearing housing 10. The second component 33 of the device 30 according to the invention has been released from the turbine bearing housing 10 after removal of the turbine bearing 26 or is yet to be fastened for the purpose of installing the turbine bearing 26 in the turbine bearing housing 10. In the latter case, however, the turbine bearing 26 must be moved into an intermediate position close to its operating position before fastening the second component 33.

In order to avoid damage to the thread 25 of the tie rod 23, a rotor protection cap 49 may be placed over the former. This is preferably placed over the end of the tie rod before moving the turbine bearing 26. The rotor protection cap 49 is installed or removed with the assistance of the turbine bearing 26 or using the dummy bearing described below.

Figure 3:
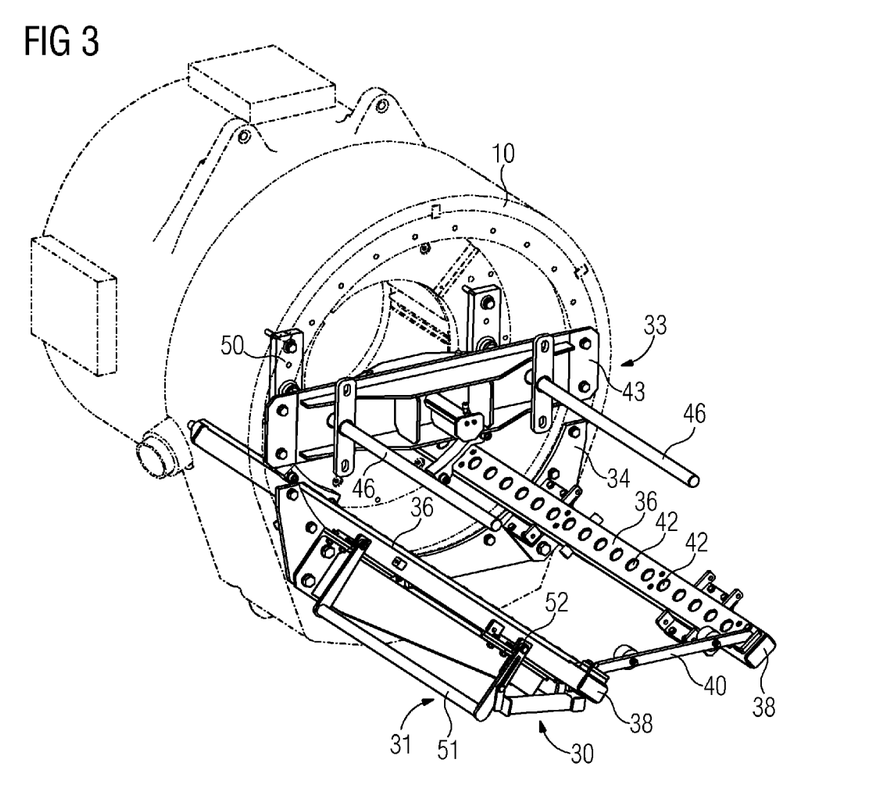
FIG. 3 shows the turbine bearing as shown in FIG. 2 having, arranged thereon, a device for inserting the turbine bearing.

Furthermore, a securing bracket 51 is represented in FIGS. 2 to 4. This securing bracket 51 can be pivoted about an axis 52 such that elements articulated thereto can latch into the movement path of the turbine bearing 26 and thus decelerate and prevent a free movement of the turbine bearing 26 along the roller tracks. In the position shown, the securing bracket 51 is locked. The movement path is unlocked and freed by raising the securing bracket 51 from the position shown.

FIG. 5 shows the perspective representation of the turbine bearing 26 with a cover plate 47, a bearing ring 45 and a plurality of bearing segments 44 having sliding elements 54 arranged thereon.

It is of course also possible, using the device 30 shown and the methods described, to exchange what are termed dummy bearings for design turbine bearings. Dummy bearings are generally installed instead of the design turbine bearings as an auxiliary measure for rotor transport and/or gas turbine transport, in order to avoid damage to the design turbine bearing during transport.

Overall, the invention thus relates to a method and a device 30 for carrying out the method for installing/removing a turbine bearing 26 or a bearing segment of a preferably static turbomachine having a housing which preferably can be split in half, when the housing is closed, having the steps of:

a) supporting the rotor 12 and/or holding the rotor 12 in order to free the turbine bearing 26 from the weight of the rotor 12, b) fastening a support plate 34 to a turbine bearing housing 10, attaching to the support plate 34 two mutually parallel rail-like beams 36 and fastening a cross beam 40 to ends 38 of the beams 36, c) fastening an abutment plate 43 having at least two push/pull rods 46 to the turbine bearing housing 10 and fastening the push/pull rods 46 to the turbine bearing 26 and releasing the fastening of the turbine bearing 26 from the turbine bearing housing 10 and extracting the turbine bearing 26, which is in its operating position, from the turbine bearing housing 10 with the aid of the push/pull rods 46.

With the aid of the proposed solution, the downtime of static turbomachines can be reduced and the availability can be increased.

The invention claimed is:

1. A method for removing or installing a turbine bearing, or one of its constituent parts, of a static turbomachine when a housing of the static turbomachine is closed, the method comprising:
   a) supporting a rotor and/or holding the rotor in order to free the turbine bearing from the weight of the rotor,
   b) fastening a support plate to an end face of a turbine bearing housing, attaching to the support plate two mutually parallel rail-like beams so that the beams extend into and out of the turbine bearing housing, and fastening a cross beam to those ends of the beams which are opposite the support plate,
   c) positioning the turbine bearing on the beams so that the beams act as a cantilevered support under the turbine bearing, and
   d) moving the turbine bearing on the beams from a first position to a second position.

2. The method as claimed in claim 1, wherein the method is for installing the turbine bearing, wherein step c) comprises placing the turbine bearing to be installed on the beams and moving the turbine bearing into the first position that is an intermediate position, and wherein step d) comprises moving the turbine bearing, or one of its constituent parts, from the intermediate position into the second position that is its installation position.

3. The method as claimed in claim 2, wherein, before step c), for each beam a sliding element is fastened to the turbine bearing.

4. The method as claimed in claim 2, wherein, before or after step b),
   an abutment plate having at least two movable push/pull rods is fastened to the turbine bearing housing and the push/pull rods are fastened to the turbine bearing and the movement is performed by the push/pull rods.

5. The method as claimed in claim 1, wherein the method is for removing the turbine bearing, wherein step c) comprises releasing a fastening of the turbine bearing from the turbine bearing housing and wherein step d) comprises extracting the turbine bearing, or one of its constituent parts, from the turbine bearing housing.

6. The method as claimed in claim 5, wherein, before step d), for each beam a sliding element is fastened to the turbine bearing.

7. The method as claimed in claim 5, wherein, before or after step b), an abutment plate having at least two push/pull rods is fastened to the turbine bearing housing and the push/pull rods are fastened to the turbine bearing and the extraction is performed with the aid of the push/pull rods.

8. The method as claimed in claim 1, further comprising braking movement of the turbine bearing along the beams via a locking element that is secured to a pivotable securing bracket that is arranged on at least one of the beams.

9. The method as claimed in claim 1, wherein the beams are in each case configured as a roller track and the rolling planes thereof are inclined with respect to one another.

10. A device for installing or removing a turbine bearing, or one of its constituent parts, of a static turbomachine when a housing of the static turbomachine is closed, comprising:
    a support plate for fastening to a turbine bearing housing of the turbine bearing,
    at least two mutually parallel rail-like beams which are fastened perpendicularly to the support plate,
    a cross beam which is fastened to beam ends,
    a pivotable securing bracket arranged on at least one beam, and
    a locking element which brakes the movement, along the beams, of the turbine bearing to be removed/installed, being articulated on this bracket via at least one joint.

11. The device as claimed in claim 10, further comprising:
    an abutment plate provided for fastening to the turbine bearing housing and having at least two push/pull rods which can be moved thereon and which are provided for fastening to the component to be removed or installed.

12. The device as claimed in claim 10, wherein the beams are in each case configured as a roller track and rolling planes thereof are inclined with respect to one another.

13. A method, comprising:
    a) supporting a rotor and/or holding the rotor using the device of claim 10 in order to free a turbine bearing from the weight of the rotor,
    b) fastening the support plate of the device to the turbine bearing housing, attaching to the support plate of the device the at least two mutually parallel rail-like beams of the device and fastening the cross beam of the device to those ends of the beams which are opposite the support plate,
    c) positioning the turbine bearing on the beams and
    d) moving the turbine bearing on the beams from a first position to a second position.

14. A device for installing or removing a turbine bearing, or one of its constituent parts, of a static turbomachine when a housing of the static turbomachine is closed, comprising:
    a support plate configured to be secured to an end side of an annular bearing housing,
    at least two mutually parallel rail-like beams which are fastened perpendicularly to the support plate and which are configured to extend into and out of the annular bearing housing, wherein an end of the beams extending out of the annular bearing housing is configured to act as a cantilevered support under the turbine bearing, and
    a cross beam which is fastened to beam ends.

15. The device of claim 14, wherein the beams are in each case configured as a roller track and rolling planes thereof are inclined with respect to one another.

* * * * *